Patented Sept. 26, 1922. 1,430,294

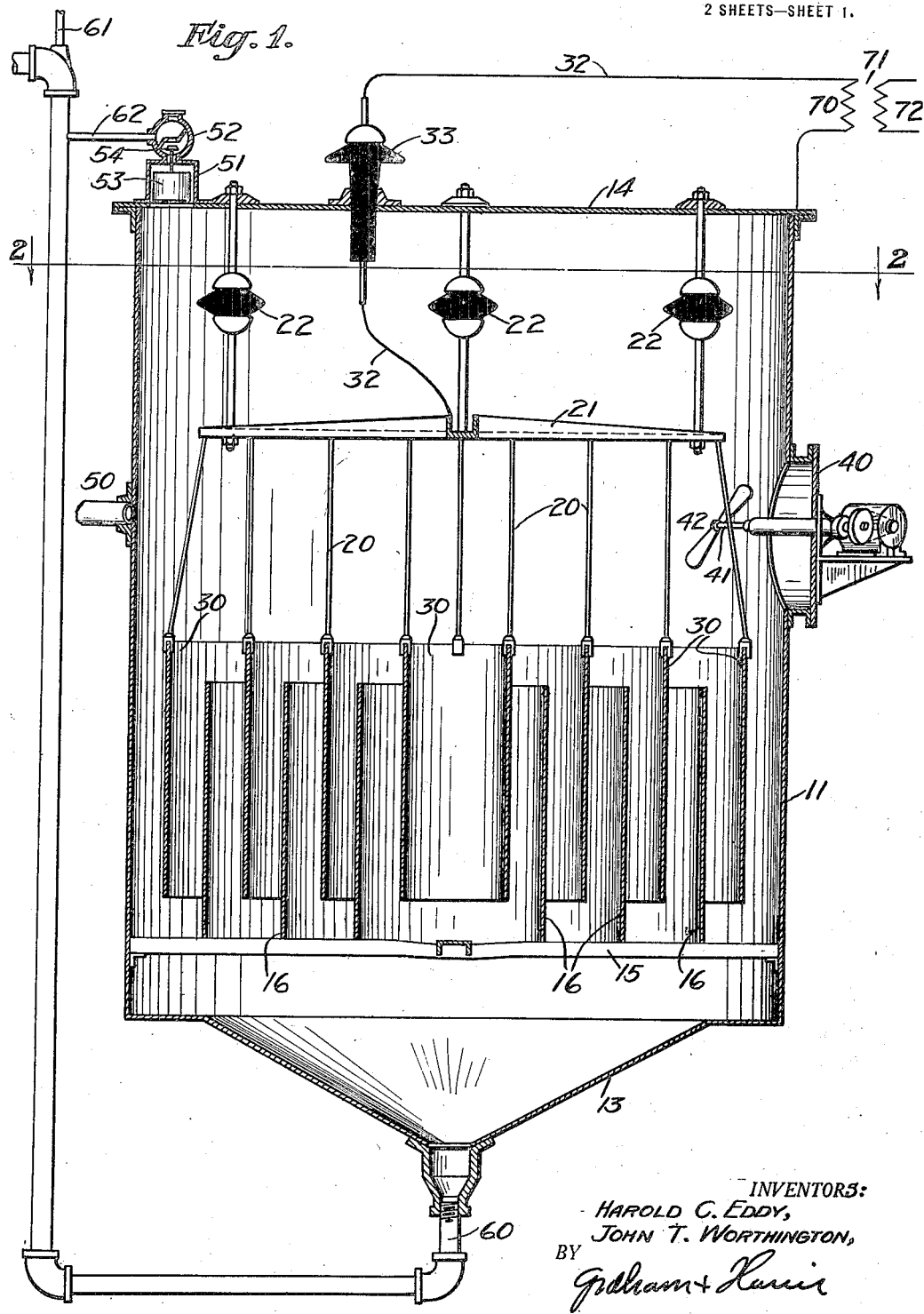

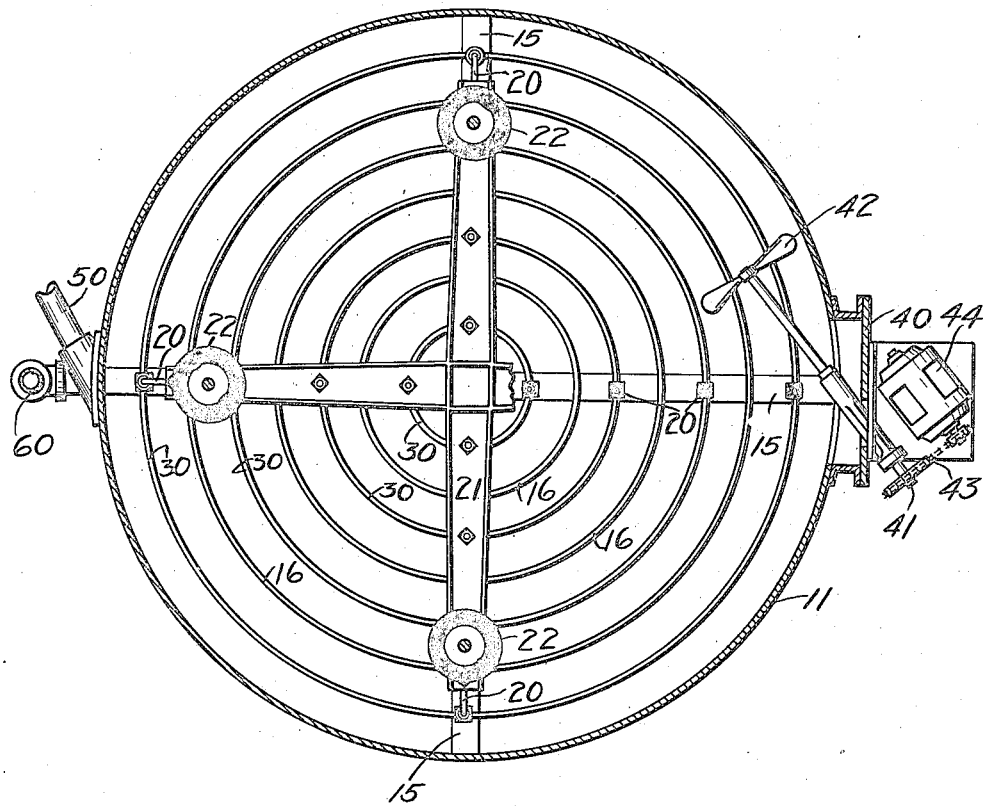

UNITED STATES PATENT OFFICE.

HAROLD C. EDDY, OF LOS ANGELES, AND JOHN T. WORTHINGTON, OF WHITTIER, CALIFORNIA, ASSIGNORS TO PETROLEUM RECTIFYING COMPANY OF CALIFORNIA, OF SAN FRANCISCO, CALIFORNIA, A CORPORATION OF CALIFORNIA.

DEHYDRATOR.

Application filed March 2, 1921. Serial No. 449,061.

*To all whom it may concern:*

Be it known that we, HAROLD C. EDDY and JOHN T. WORTHINGTON, both citizens of the United States, the former residing at Los Angeles, in the county of Los Angeles and State of California, the latter residing at Whittier, in the county of Los Angeles and State of California, have invented a new and useful Improvement in Dehydrators, of which the following is a specification.

Our invention relates to dehydrators which are used for separating the oil and water found in emulsions and our invention is particularly applicable to the dehydration of petroleum emulsions.

It is a well known fact that emulsions and particularly petroleum emulsions often consist of microscopic particles of water carried in a mass of oil. These microscopic particles are so small that they will not settle out by gravity but when such an emulsion is subjected to the action of an electric current, the water particles agglomerate into large masses which may be readily removed by gravitation or other methods.

Our invention relates particularly to a device for causing this agglomeration.

Referring to the drawings which are for illustrative purposes only,

Fig. 1 is a side elevation of our invention partly in section and,

Fig. 2 is a section on a plane represented by the line 2—2 of Fig. 1.

In the form of dehydrator shown, a cylindrical tank 11 is provided, this tank having a conical bottom 13 and a tight top 14. Supported in the tank 11 on channel irons 15 are a series of grounded electrodes 16 which are in the form of cylinders concentrically placed about the axis of the tank 11. Supported on rods 20 from a spider 21 which is supported by means of insulators 22 in the top of the tank 14 are a series of live electrodes 30, these electrodes also being cylindrical and being supported equal distant from the electrodes 16. The spider 21 is connected to an external circuit by a wire 32 which passes through an outlet bushing 33.

Secured to a man hole cover 40 in the side of the tank is a shaft 41 carrying a propeller 42. The shaft 41 projects through a stuffing box to the outside of the tank and is driven by any suitable drive 43 from an electric motor 44 or any source of power. Emulsion is introduced into the tank tangentially through a pipe 50. Formed in the cover 14 is a chamber 51 having a valve body 52 secured thereto, this valve body having an opening therethrough. Located in the chamber 51 is a float 53 carrying a valve 54 which closes the opening in the valve body 52 when the float 53 rises. An outlet pipe 60 is connected into the bottom 13 and passes upwardly as shown having a small vent 61 a point above the top 14 of the tank 11. The pipe 60 is connected to the valve body 52 through a pipe 62. The wire 32 is connected to the secondary 70 of a transformer 71. The other side of the secondary 70 is connected to the tank 11. The primary 72 of the transformer 71 is energized from any convenient source, not shown.

The method of operation is as follows:

The tank is first filled with emulsion through the pipe 50, the air inside the tank escaping through the valve body 52 due to the fact that the float 53 is in its lower position as shown in the drawing, and the air escapes readily through the pipe 62 and the vent 61. As soon as the tank is entirely filled, liquid rises in the chamber 51 and the float 53 is lifted, closing the outlet through the valve body 52. This float tends to fall whenever there is any accumulation of gas or air in the chamber 51 thus allowing gas or air to escape. The emulsion introduced tangentially into the tank 11 through the pipe 50 tends to set up a whirling motion inside the tank, which whirling motion is greatly increased by the action of the propeller 42. An alternating potential being impressed on the primary 72 of the transformer 71, an alternating electric potential is impressed between the wire 32 and the tank 11. This potential which may be about 11,000 volts is, therefore, impressed between the live electrodes 30 and the grounded electrode 16 and the tank 11. A dehydrating action takes place between these electrodes, the water falling out of the oil into the bottom of the treater 13. By introducing the oil through the pipe 50, at some distance below the top of the treater, a pocket is formed in the top of the treater into which the thoroughly cleaned dry oil tends to rise due to its being of lighter specific gravity than the emulsion. The result is that after the treater has been operated for a short time, the entire top of the treater above the propeller 42 is entirely filled with this dry cleaned oil, thus greatly relieving the strain in the inlet bushing 32 and the insulators 22.

As soon as the initial charge of oil has been cleaned to a sufficient degree, emulsion may be introduced through the pipe 50 at a continuous rate, this emulsion forcing out the water and oil through the pipe 60. The water and oil which pass out through the pipe 60 are deemulsified in the sense that the water particles have been agglomerated into such a large size that they may be readily separated from the oil by any one of the many known methods, such as gravitational or centrifugal separation.

We claim as our invention:

1. An apparatus for de-emulsifying petroleum emulsions comprising a cylindrical tank; a cylindrical electrode inside of and concentric with said tank; and mechanical means for imparting a whirling movement to a body of emulsion carried in said tank.

2. An apparatus for de-emulsifying petroleum emulsions comprising a cylindrical tank; a cylindrical electrode inside of and concentric with said tank; a propeller so placed as to cause a body of emulsion in said tank to rotate; and means for driving said propeller.

3. An apparatus for de-emulsifying petroleum emulsions comprising a cylindrical tank; a cylindrical electrode inside of and concentric with said tank; a propeller so placed as to cause a body of emulsion in said tank to rotate; and means outside said tank for driving said propeller.

4. An apparatus for de-emulsifying petroleum emulsions comprising a tank; stationary electrodes in said tank; a propeller situated in the top of said tank above the dehydrating zone and so placed as to cause a body of emulsion in said tank to rotate; and means for driving said propeller.

5. An apparatus for de-emulsifying petroleum emulsions comprising a tank; stationary electrodes in said tank; a propeller situated in the top of said tank above the dehydrating zone and so placed as to cause a body of emulsion in said tank to rotate; and means outside said tank for driving said propeller.

6. An apparatus for de-emulsifying petroleum emulsions comprising a cylindrical tank; a cylindrical electrode inside of and concentric with said tank; a propeller situated in the top of said tank above the dehydrating zone and so placed as to cause a body of emulsion in said tank to rotate; and means for driving said propeller.

In testimony whereof, we have hereunto set our hands at Los Angeles, California, this 19th day of February, 1921.

HAROLD C. EDDY.
JOHN T. WORTHINGTON.